(12) United States Patent
Kumar

(10) Patent No.: US 9,048,512 B2
(45) Date of Patent: Jun. 2, 2015

(54) NANOSIZED ELECTROCHEMICAL DISPERSION FOR RECHARGEABLE ALKALINE ZINC BATTERIES

(76) Inventor: Thothathri Sampath Kumar, Bangalore (IN)

(*) Notice: Subject to any disclaimer, the term of this patent is extended or adjusted under 35 U.S.C. 154(b) by 1497 days.

(21) Appl. No.: 12/226,068

(22) PCT Filed: Jun. 5, 2006

(86) PCT No.: PCT/IN2006/000188
§ 371 (c)(1),
(2), (4) Date: Aug. 24, 2009

(87) PCT Pub. No.: WO2007/116413
PCT Pub. Date: Oct. 18, 2007

(65) Prior Publication Data
US 2009/0311580 A1 Dec. 17, 2009

(30) Foreign Application Priority Data
Apr. 12, 2006 (IN) .............................. 678/CHE/2006

(51) Int. Cl.
H01M 10/26 (2006.01)
H01M 6/04 (2006.01)
H01M 4/13 (2010.01)
H01M 4/58 (2010.01)
H01M 4/42 (2006.01)
H01M 2/16 (2006.01)
H01M 10/28 (2006.01)

(52) U.S. Cl.
CPC .......... H01M 10/26 (2013.01); Y10T 29/49108 (2015.01); H01M 10/28 (2013.01); Y02E 60/124 (2013.01)

(58) Field of Classification Search
USPC .............. 429/218.1, 229, 248, 231, 206, 227, 429/292
IPC .................. H01M 4/5825,10/26, 6/04, 4/42
See application file for complete search history.

(56) References Cited

U.S. PATENT DOCUMENTS

| | | | |
|---|---|---|---|
| 2,892,797 A * | 6/1959 | Alexander et al. ............... | 516/79 |
| 3,516,862 A | 6/1970 | Van Der Grinten et al. | |
| 3,816,178 A | 6/1974 | Maki et al. | |
| 4,041,221 A | 8/1977 | Berchielli et al. | |
| 4,224,391 A | 9/1980 | Eisenberg | |
| 4,273,841 A | 6/1981 | Carlson | |
| 4,304,828 A * | 12/1981 | Vaidyanathan ............... | 429/206 |
| 4,358,517 A | 11/1982 | Jones | |
| 4,418,130 A | 11/1983 | Soltis et al. | |
| 4,520,005 A | 5/1985 | Yao | |
| 5,215,836 A | 6/1993 | Eisenberg | |
| 5,453,336 A | 9/1995 | Adler et al. | |
| 5,460,899 A | 10/1995 | Charkey | |
| 5,556,720 A | 9/1996 | Charkey | |
| 5,824,434 A * | 10/1998 | Kawakami et al. ........... | 429/209 |
| 7,033,700 B2 * | 4/2006 | Phillips ........................ | 429/231 |
| 2003/0077515 A1 | 4/2003 | Chen et al. | |
| 2005/0112463 A1 | 5/2005 | Phillips | |
| 2005/0112465 A1 | 5/2005 | Phillips | |
| 2005/0244714 A1 | 11/2005 | Zhu et al. | |

FOREIGN PATENT DOCUMENTS

| | | |
|---|---|---|
| DE | 10327365 A1 | 1/2005 |
| JP | 60-056368 | 4/1985 |
| JP | 60-167264 | 8/1985 |
| JP | 60-167264 | 5/1986 |
| WO | WO 04/000311 A2 | 12/2003 |
| WO | WO 2005/123587 | 12/2005 |

OTHER PUBLICATIONS

Adler et al., "Low-Zinc Solubility Electrolytes for Use in Zinc/Nickel Oxide Cells", J. Electrochem. Soc. vol. 140, No. 2, Feb. 1993, pp. 289-293.
Gognon, "Effect of Ten Weight Percent KOH Electrolyte on Durability of Zinc/Nickel Oxide Cells Containing Zinc Electrodes With Calcium Hydroxide", J. Electrochem. Soc., vol. 138, No. 11, Nov. 1991, pp. 3173-3176.
Nichols et al., "Zinc Electrode Cycle—Life Performance in Alkaline Electrolytes Having Reduced Zinc Species Solubility", Chem. Eng. Commun., vol. 37, pp. 355-379, 1985.

* cited by examiner

Primary Examiner — Patrick Ryan
Assistant Examiner — Julian Anthony
(74) Attorney, Agent, or Firm — Foley & Lardner LLP

(57) ABSTRACT

The present invention relates to a nanosized electrochemical dispersion comprising essentially modified silica sol and at least one additive; also a process of preparing nanosized electrochemical dispersion, wherein the process comprises step of loading at least one additive to metalate modified silica sol to obtain the dispersion; in addition a rechargeable alkaline storage zinc battery comprising nanosized electrochemical dispersion consisting of essentially modified silica sol and at least one additive; further a method of manufacturing a rechargeable alkaline storage zinc battery, wherein the method comprises steps of adding a nanosized electrochemical dispersion consisting essentially modified silica sol and at least one additive into a conventional alkaline storage zinc battery to obtain a rechargeable alkaline storage zinc battery; and further a process to prevent dissolution of zinc in a battery, wherein the process comprises addition of nanosized aqueous electrochemical dispersion comprising essentially modified silica sol and at least one additive to the battery, and preventing the dissolution of zinc electrode in the battery.

17 Claims, No Drawings

NANOSIZED ELECTROCHEMICAL DISPERSION FOR RECHARGEABLE ALKALINE ZINC BATTERIES

FIELD OF THE INVENTION

The present invention is in relation to the rechargeable alkaline zinc batteries having zinc electrode and an alkaline electrolyte. More particularly, the present invention relates to a nanosized electrochemical dispersion used to prevent the solubility of zinc and to have high energy density rechargeable battery having zinc/compounds as negative electrode.

BACKGROUND OF THE INVENTION

This invention relates to secondary batteries, and, in particular, to secondary batteries employing zinc electrodes. Conventional secondary batteries employing zinc electrodes such as, for example, silver-zinc and nickel-zinc alkaline batteries, exhibit a decline in cell capacity with continued cycling. This decline in cell capacity is attributable to the morphological changes, typically referred to as shape changes, which occur in the negative zinc battery electrode. The net effect of these shape changes is agglomeration and densification of the zinc electrode in the centre with a consequent reduction in surface area available for electrochemical reaction and formation of dendrites resulting in short circuiting.

A requirement is, however, that such cells and batteries must be cycled many times through discharge/charge cycles; leading in turn to several further requirements. The first is that the capacity of the rechargeable cell should not diminish significantly over a number of cycles, there should be no significant shape change particularly of the zinc electrode and no significant dendrite formation. Most especially, newly developed high energy density rechargeable zinc cells should be free or substantially free of toxicity, so as to be environmentally benign.

A number of additives were used in the past without much success. This invention presents the development of a product using which; the solubility of zinc in the electrolyte can be suppressed. A large number of people who have worked on this subject have failed and what was considered to be an insolvable problem has been solved due to this invention.

PRIOR ART

U.S. Pat. No. 3,516,862 (Grinten et al) describes a composition to prevent the solubility of zinc electrode, wherein said composition comprises of calcium hydroxide and calcium oxide. However the said process suffers from the disadvantage of forming a porous matrix on a short erect thread of a velvet fabric and spacing between the matrix and the positive electrode.

U.S. Pat. No. 3,816,178 (Maki et al) describes a composition to prevent the solubility of zinc electrode wherein said mixture consists essentially of zinc oxide, calcium compounds and oxides of lead. This process is associated with the disadvantage that lead is a toxic material which poses problems during recycling of the batteries.

U.S. Pat. No. 4,358,517 (Richard et al) describes a nickel-zinc cell wherein the efficiency of the cell is improved by the addition of lead compounds. This process is also associated with the toxic material lead.

U.S. Pat. No. 4,041,221 (Berchielli et al) describes the methods of making zinc electrodes wherein an inorganic titanate compound is incorporated to improve the performance of zinc. Furthermore, the said titanate compound is used in concentration ranging from 0.2% by weight to about 1.8% by weight. However, the application of instant invention provides a wide range for improving the performance of zinc electrode, range is 0.001% by weight to 50% by weight.

U.S. Pat. No. 4,304,828 (Vaidyanathan et al) addition of Zinc fluoride and zinc titanate to improve the performance of zinc electrode. However, the proposed method does not suggest any dispersing agent to ensure the uniform distribution of the additive in the electrolyte so as to ensure that the solubility of zinc is prevented.

U.S. Pat. No. 4,418,130 (Soltis et al) the proposed method uses about 10% barium hydroxide as an additive to improve the performance of the zinc. However, the method is limited to range of 5-10% only.

U.S. Pat. No. 4,520,005 (Ford Motor Company) proposes the use of lead and bismuth to increase the recharge potential of the battery. However, the method suffers from the disadvantage that after 60 cycles it was still capable of approximately 55% discharging and recharging of its total electrical capacity, which is substantially less than the proposed invention in the instant application.

U.S. Pat. No. 5,460,899 (Energy research Corporation) proposes use of calcium hydroxide and a conducting matrix including a metallic oxide which is more electropositive than zinc. i.e. PbO, $Bi_2O_3$, CdO, $Ga_2O_3$, $Ti_2O_3$. However, the proposed method involves configuration of zinc electrode as a split electrode with adjacent like electrode assemblies spaced by a porous hydrophobic element. Also the zinc electrode is utilized with an electrolyte having a low concentration of electrolyte constituent.

U.S. Pat. No. 4,273,841 (Carlson) describes another mixture that employs 5-10% hydroxide, 10-20% phosphate and 5-15% fluoride. However, the proposed mixture is not associated with any carrier so as to prove its uniform distribution in the electrolyte.

U.S. Pat. No. 5,453,336 (Adler et al) a mixture of alkaline electrolyte combined with a carbonate of 0.5-4 M is particularly effective. However, the proposed methodology was not able to arrive at the instant application of invention.

U.S. Pat. Nos. 4,224,391, 5,215,836 (Eisenberg et al)—describes two electrolyte formulations. Both employ mixtures of potassium hydroxide and boric, phosphoric or arsenic acid. However, the proposed methodology was not able to arrive at the instant application of invention U.S. Pat. No. 5,556,720 Charkey 1996—electrode addition of $Ba(OH)_2$, $Sr(OH)_2$ and numerous other oxide additives like lead oxide, bismuth trioxide, cadmium oxide, gallium trioxide, titanium trioxide. However, it should be noted that lead, cadmium and mercuric oxide are particularly toxic and undesirable.

US Publication Nos. 20050112465, 20050112463 (Phillips Jeffrey et al). Proposes addition of fluorides, from elements of group 1b, group 3a, and group 4a, with redox potential positive of the zinc potential, boric salt, bismuth oxide (no cadmium, no lead, no mercury battery) to the zinc electrode. Addition of boric and phosphoric acid to the electrolyte Zinc electrode fabricated using inorganic fibers with a composite of 80-99% aluminium oxide, and 1-20% silica. However the proposed additives say for instance silica is used at a limited concentration range of 1% to 20% silica in comparison to the proposed invention having a range from 0.001% to 50% by weight.

US Publication No. 20050244714 (Zhu et al) Proposes a method of fabrication of negative electrode using an additive containing Calcium compound, tricalcium silicate, dicalcium silicate and tricalcium aluminate. However, fabrication of electrode is time consuming process and involves a combination of various steps to attain the product. The proposed invention is devoid of such steps wherein it only involves the addition of the composition to the alkaline electrolyte to increase the efficiency of the zinc electrode.

Japanese application 60056368 Sanyo electric—indicates binding the zinc active material with fibrous connection network of a fluorine resin and alumina fibers to make zinc electrode. However, the proposed methodology was not able to arrive at the instant application of invention Japanese application 60167264 suppression of dendrite formation by forming a thin layer containing alumina fiber and a cadmium compound on the surface of a zinc active material layer. The method utilizes toxic compound cadmium which is undesirable.

Japanese application 61104564—teaches inhibiting the development of zinc dendrite by using an additive in addition to the oxide or hydroxide of indium in the zinc electrode. However, the proposed methodology was not able to arrive at the instant application of invention.

Chem. Eng. Commun. Vol 37, pp. 355-379 1985. Title "Zinc electrode cycle life performance in alkaline electrolytes having reduced zinc species solubility". Reports the use of alkaline fluoride and alkaline borate to reduce zinc solubility. However, the proposed methodology was not able to arrive at the instant application of invention J. Electrochem. Soc. Vol. 138, No. 11 November 1991 pp 3173-3176—Effect of Ten weight percent KOH electrolyte on durability of zinc/nickel oxide cells containing zinc electrodes with calcium hydroxide by E G. Gagnon. The formation of Calcium zincate's structure is known to suppress the solubility of ZnO at lower KOH concentrations especially at 20% w/o KOH. However it is also shown that the calcium zincate's structure was not stable at higher KOH concentration of 37.5 w/o KOH. These results suggest that the calcium zincate structure undergoes a decomposition at certain regions in the zinc electrode leaving behind the $Ca(OH)_2$ which is very insoluble in KOH. In the range of 28 to 37.5 w/o KOH the calcium zincate is not stable.

The conclusion is that at the normal concentration of electrolyte of 20%-30% KOH, the $Ca(OH)_2$ is highly insoluble, the zincate is unstable and hence the addition of $Ca(OH)_2$ fails to suppress the solubility of ZnO.

J. Electrochem. Soc. Vol 140 No. 2, February 1993 pp 289-294, Low zinc solubility electrolytes for use in zinc/nickel oxide cells.—T. C. Adler, F. R. McLarnon and E. J. Cairns.—All models suggest that if the amount of Zn dissolved in the electrolyte is decreased the rate of zinc redistribution will decrease.

The proposed invention utilizes U.S. Pat. No. 2,892,797 (Alexander et al) for the preparation of a metalate modified silica sol over which at least one additive is loaded and formulated to attain nanosized electrochemical dispersion.

Due to the limitations of the prior art, it is therefore desirable to have a nanosized electrochemical dispersion to improve the efficiency of zinc electrode by preventing its solubility and hence to attain batteries with these electrodes having higher capacity.

OBJECTS OF THE PRESENT INVENTION

The principal object of this invention is to develop a nanosized electrochemical dispersion to prevent the dissolution of zinc and its compounds into the alkaline electrolyte.

Another object of this invention is to develop a process involved in attaining the nanosized electrochemical dispersion.

Yet another object of the invention is to develop a rechargeable alkaline storage zinc battery comprising nanosized electrochemical dispersion consisting of essentially modified silica sol and at least one additive.

Still another object of the present invention is to develop a method of manufacturing a battery using the proposed electrochemical composition.

Still another object of the present invention is to develop a process to prevent dissolution of zinc in a battery.

STATEMENT OF THE INVENTION

The present invention relates to a nanosized electrochemical dispersion comprising essentially modified silica sol and at least one additive; a process of preparing nanosized electrochemical dispersion, wherein the process comprises step of loading at least one additive to metalate modified silica sol to obtain the dispersion; a rechargeable alkaline storage zinc battery comprising nanosized electrochemical dispersion consisting of essentially modified silica sol and at least one additive; a method of manufacturing a rechargeable alkaline storage zinc battery, wherein the method comprises steps of adding a nanosized electrochemical dispersion consisting essentially modified silica sol and at least one additive into a conventional alkaline storage zinc battery to obtain a rechargeable alkaline storage zinc battery and a process to prevent dissolution of zinc in a battery, wherein the process comprises steps of: adding nanosized aqueous electrochemical dispersion to the battery, and preventing the dissolution of zinc electrode in the battery.

DETAILED DESCRIPTION OF THE PRESENT INVENTION

The present invention relates to a nanosized electrochemical dispersion comprising essentially modified silica sol and at least one additive.

Yet another embodiment of the present invention, wherein the composition is aqueous in nature.

In yet another embodiment of the present invention, wherein the sol is metalate modified silica sol.

In still another embodiment of the present invention, wherein the metalate ions used to modify the silica sol is selected from group comprising alumina, lead, tin, and zinc.

In still another embodiment of the present invention, wherein the metalate ions used to modify the silica sol is alumina.

In still another embodiment of the present invention, wherein the metalate modified silica sol is having silica contents ranging between 0.001% to 50 wt %.

In still another embodiment of the present invention, wherein the metalate modified silica sol is having silica contents of about 5 wt %.

In still another embodiment of the present invention, wherein the diameter of metalate modified silica sol ranges from 1 to 150 milli microns.

In still another embodiment of the present invention, wherein the diameter of metalate modified silica sol ranges from 20 to 50 milli microns.

In still another embodiment of the present invention, wherein the surface area of metalate modified silica sol ranges from 100 $m^2$ to 1000 $m^2$ per gram of silica.

In still another embodiment of the present invention, wherein the additives are selected from a group comprising calcium hydroxide, barium hydroxide, strontium hydroxide, titanium oxide, indium hydroxide, borax and fluorides.

In still another embodiment of the present invention, wherein the additives are formed insitu by the addition of water-soluble salts containing the elements.

In still another embodiment of the present invention, wherein the additives having a concentration range of 0.001% to 50 wt % of the silica in the metalate modified silica sol.

In still another embodiment of the present invention, wherein the additives having a concentration of about 20 wt % of the silica in the metalate modified silica sol.

The present invention relates a process of preparing nanosized electrochemical dispersion, wherein the process comprises step of loading at least one additive to metalate modified silica sol to obtain the dispersion.

Yet another embodiment of the present invention, wherein the metalate modified silica sol is having silica contents ranging between 0.001% to 50 wt %.

In still another embodiment of the present invention, wherein the concentration of silica sol used is about 5%.

In still another embodiment of the present invention, wherein the diameter of metalate modified silica ranges from 1-150 milli microns.

In still another embodiment of the present invention, wherein the diameter of metalate modified silica ranges from 20-50 milli microns.

In still another embodiment of the present invention, wherein the surface area of the metalate modified silica sol ranges from 100 $m^2$ to 1000 $m^2$ per gram of silica.

In still another embodiment of the present invention, wherein the additive is selected from a group comprising calcium hydroxide, barium hydroxide, strontium hydroxide, titanium oxide, indium hydroxide, borax and fluorides.

In still another embodiment of the present invention, wherein the additives are formed insitu by the addition of water-soluble salts containing the elements.

In still another embodiment of the present invention, wherein additives having a concentration range of 0.001% to 50 wt % of the silica in the metalate modified silica sol.

In still another embodiment of the present invention, wherein the dispersion is maintained at pH ranging between 7 to 11.

In still another embodiment of the present invention, wherein the dispersion is maintained at pH of about 8.

The present invention relates to a rechargeable alkaline storage zinc battery comprising nanosized electrochemical dispersion consisting of essentially modified silica sol and at least one additive.

Yet another embodiment of the present invention, wherein the sol is metalate modified silica sol.

In still another embodiment of the present invention, wherein the metalate ions used to modify the silica sol is selected from group comprising alumina, lead, tin, and zinc.

In still another embodiment of the present invention, wherein the metalate ions used to modify the silica sol is alumina.

In still another embodiment of the present invention, wherein the additives are selected from a group comprising calcium hydroxide, barium hydroxide, strontium hydroxide, titanium oxide, indium hydroxide, borax and fluorides.

In still another embodiment of the present invention, wherein the concentration of the dispersion is ranging between 1 to 50 wt % of electrolyte concentration.

The present invention relates to a method of manufacturing a rechargeable alkaline storage zinc battery, wherein the method comprises steps of adding a nanosized electrochemical dispersion consisting essentially modified silica sol and at least one additive into a conventional alkaline storage zinc battery to obtain a rechargeable alkaline storage zinc battery.

Yet another embodiment of the present invention, wherein the sol is metalate modified silica sol.

In still another embodiment of the present invention, wherein the metalate ions used to modify the silica sol is selected from group comprising alumina, lead, tin, and zinc.

In still another embodiment of the present invention, wherein the metalate ions used to modify the silica sol is alumina.

In still another embodiment of the present invention, wherein the additives are selected from a group comprising calcium hydroxide, barium hydroxide, strontium hydroxide, titanium oxide, indium hydroxide, borax and fluorides.

In still another embodiment of the present invention, wherein the concentration of the dispersion is ranging between 1 to 50 wt % of electrolyte concentration.

The present invention relates to a process to prevent dissolution of zinc in a battery, wherein the process comprises steps of:
  a) adding nanosized aqueous electrochemical dispersion comprising essentially modified silica sol to the battery, and
  b) preventing the dissolution of zinc electrode in the battery.

Yet another embodiment of the present invention, wherein the sol is metalate modified silica sol.

In still another embodiment of the present invention, wherein the metalate ions used to modify the silica sol is selected from group comprising alumina, lead, tin, and zinc.

In still another embodiment of the present invention, wherein the metalate ions used to modify the silica sol is alumina.

In still another embodiment of the present invention, wherein the additives are selected from a group comprising calcium hydroxide, barium hydroxide, strontium hydroxide, titanium oxide, indium hydroxide, borax and fluorides.

In still another embodiment of the present invention, wherein the concentration of the dispersion is ranging between 1 to 50 wt % of electrolyte concentration.

The Prior art has specified a number of compounds that are effective in suppressing the solubility of zinc and its compounds in the electrolyte. The compounds most favored are $Ca(OH)_2$, $Ba(OH)_2$, $Sr(OH)_2$, fluorides, compounds of Boron, lead, cadmium, bismuth, mercury, tin, titanium, gallium, antimony, Indium.

Although the additives have a property of suppressing the solubility of zinc in alkaline electrolytes, they have not been very effective due to the fact that they are not distributed throughout either the electrolyte or the zinc compound uniformly. This results in pockets of suppression and pockets where there is no compound to suppress the solubility of zinc. Hence the erratic behavior of suppression is manifested and the compound fails to deliver the desired result. In this context it is pertinent to recall the prior art wherein Calcium hydroxide:Calcium zincate could suppress the solubility of zinc. Since the Calcium hydroxide became insoluble in the electrolyte it could no longer do its job.

The essence of this invention is to reduce the particle size of the additive by loading it on to a sol that is distributed throughout the electrode or electrolyte in such a manner that the suppression of zinc solubility is possible at every point wherever the electrolyte has a point of contact with the electrodes.

The base material for all the additives is a metalate modified silica sol preferably alumina modified silica sol made as per the procedure laid out in invention U.S. Pat. No. 2,892, 797 by Guy B Alexander and Ralp K Iler. The particle size may vary from 1-150 millimicron. It is preferably to have within 50 millimicron. This sol is dispersible in the electrolyte i.e. KOH, NaOH, LiOH, from 1% to 40% without gelling or precipitation.

The various additives are loaded on to this sol in such a manner that a layer of the additives is adsorbed onto the metalate modified silica sol. The soluble salt of the additive is added to the metalate-modified sol slowly. After mixing, the pH is brought to 8. This additive loaded onto metalate modified silica sol is the product that is added to the electrolyte to carry out the necessary task of suppressing the solubility of zinc.

By the process of this invention the loading of the Calcium compound on top of a metalate modified silica sol (alumina metalate preferred, prepared as per U.S. Pat. No. 2,892,797) and added to the electrolyte is distributed throughout the length of the electrolyte column. It is stable as a sol and is able to suppress the solubility of zinc and its compounds. A combination of additives loaded onto metalate modified silica sol is used to suppress zinc dissolution.

This invention also for the first time reduces the quantity of additive necessary for the zinc solubility suppression. Since the particle size of the additive is in the nano range, the surface area is large and hence the total quantity required is drastically reduced. Even where toxic materials, expensive materials are required the fact that the quantity required is so small that it is easily acceptable both from costing as well as environment.

The technology of the instant Application is further elaborated with the help of following examples. However, the examples should not be construed to limit the scope of the invention.

EXAMPLE 1

100 ml of an alumina modified silica sol make as per U.S. Pat. No. 2,892,797 having silica contents 5% with average particle size 20-50 millimicron was made. 2 gm of a soluble calcium salt eg. Calcium nitrate was dissolved in 10 ml of water and added to the above. The pH was raised to about 8. This is called as additive 'A'.

10 ml of 30% KOH solution was taken and 2 ml of additive A was added slowly to the KOH electrolyte. Now 0.05 gms of a zinc oxide was added to the above and it was boiled for 5 min. The zinc oxide did not dissolve in the electrolyte.

The various additives may be loaded on to the metalate modified silica sol. A mix of the zinc solubility suppressing additives may be made based on technical requirements, availability, feasibility, design and cost considerations and environmental acceptance. In all cases the quantity of additive required is very small. For instance in example 1 the quantity of calcium salt required is only about 0.2% of the electrolyte. This is the benefit of using nano-sized particles since the surface area of it is very large and only small quantities are required.

Example 1 is a chemical test for the non-dissolution of zinc oxide. To prove the usefulness for a Zn battery an electrochemical test using Zn/Ni, Zn/Mn, was conducted. The electrolyte being 30% KOH solution, to 100 ml of 30% KOH, 20 ml of additive A was added. This becomes the electrolyte solution for the battery. It was seen that even after charging and discharging for more than 250 times, no dendrites were formed. There was no shape change of the Zn electrode. The performance of the battery was repeatable as in the beginning stages.

The Applicant is in possession of the nanosized electrochemical dispersion. The dispersion is prepared by simple and inventive process of loading additive (s) to the metalate modified silica sol. The metalate modified silica sol is obtained by the methodology of U.S. Pat. No. 2,892,797. Thereafter the loading of the additives leads to the formation of the dispersion. Accordingly, the novel battery is created by the Applicant by providing the dispersion in a conventional alkaline zinc battery. However, the presence of dispersion makes the battery not only novel but also inventive in nature. Lastly, but most importantly the Applicant has arrived at a process of preventing the dissolution of zinc in the battery. The process involves addition of the dispersion in to the battery and thereby preventing the dissolution of zinc electrode.

None of the documents of the prior art of the instant Applicant provide any reference, clue or motivation to develop the dispersion of instant Application and use it for developing a battery wherein, the dissolution of zinc can be prevented. Accordingly the Applicant respectfully submits that the instant invention provides for patentable subject matter.

Advantages

The instant Application offers the advantage of recharging the alkaline zinc batteries.
The proposed invention is economical.
The proposed invention is found to include non-toxic materials.
The proposed invention is eco-friendly.

I claim:

1. A nanosized electrochemical dispersion in an electrolyte, wherein the dispersion consists of a metalate modified silica sol and at least one zinc solubility suppressing additive, wherein a layer of the zinc solubility suppressing additive is adsorbed onto the metalate modified silica sol.

2. The nanosized electrochemical dispersion as claimed in claim 1, wherein the dispersion is aqueous; metalate ions used to modify the silica sol are selected from the group consisting of alumina, lead, tin, and zinc; the silica content of the metalate modified silica sol is in the range between 0.001 wt % to 50 wt %; and the diameter of metalate modified silica sol ranges from 1 to 150 milli microns.

3. The nanosized electrochemical dispersion as claimed in claim 2, wherein the metalate ion used to modify the silica sol is alumina, the silica content of the metalate modified silica sol is 5 wt %; and the diameter of the metalate modified silica sol is in the range from 1 to 50 milli microns.

4. The nanosized electrochemical dispersion as claimed in claim 1, wherein the metalate modified silica sol has a surface area of 100 $m^2$ to 1000 $m^2$ per gram of silica; the zinc solubility suppressing additive is selected from the group consisting of calcium hydroxide, barium hydroxide, strontium hydroxide, titanium oxide, indium hydroxide, borax and fluorides; the zinc solubility suppressing additive is formed insitu by the addition of water-soluble salts containing elements selected from the group consisting of calcium, barium, strontium, titanium, indium, borax and fluorides; and the zinc solubility suppressing additive has a concentration range of 0.001 wt % to 50 wt % of the silica in the metalate modified silica sol.

5. The nanosized electrochemical dispersion as claimed in claim 4, wherein the concentration of the zinc solubility suppressing additive in the metalate modified silica sol is 20 wt % of silica.

6. A process of preparing a nanosized electrochemical dispersion in an electrolyte, wherein the process comprises the steps of (i) loading at least one zinc solubility suppressing additive to a metalate modified silica sol to obtain the dispersion; and (ii) adding the dispersion to an electrolyte to obtain the dispersion in an electrolyte, wherein a layer of the zinc solubility suppressing additive is adsorbed onto the metalate modified silica sol.

7. The process as claimed in claim 6, wherein the metalate modified silica sol has a silica content ranging between 0.001 wt % to 50 wt %; diameter of the metalate modified silica sol ranges from 1-150 milli microns; surface area of the metalate modified silica sol ranges from 100 m$^2$ to 1000 m$^2$ per gram of silica; the zinc solubility suppressing additive is selected from the group consisting of calcium hydroxide, barium hydroxide, strontium hydroxide, titanium oxide, indium hydroxide, borax and fluorides; the zinc solubility suppressing additive is formed insitu by the addition of water-soluble salts containing elements selected from the group consisting of calcium, barium, strontium, titanium, indium, borax and fluorides; the zinc solubility suppressing additive has a concentration range of 0.001 wt % to 50 wt % of the silica in the metalate modified silica sol; and the dispersion is maintained at pH ranging between 7 to 11.

8. A rechargeable alkaline storage zinc battery comprising a nanosized electrochemical dispersion in an electrolyte, wherein the dispersion consists of a metalate modified silica sol and at least one zinc solubility suppressing additive wherein a layer of the zinc solubility suppressing additive is adsorbed onto the metalate modified silica sol.

9. The rechargeable alkaline storage zinc battery as claimed in claim 8, wherein metalate ions used to modify the silica sol are selected from the group consisting of alumina, lead, tin, and zinc; the zinc solubility suppressing additive is selected from the group consisting of calcium hydroxide, barium hydroxide, strontium hydroxide, titanium oxide, indium hydroxide, borax and fluorides; and concentration of the dispersion is in the range between 1 to 50 wt % of the electrolyte concentration.

10. The rechargeable alkaline storage battery as claimed in claim 9, wherein the metalate ion used to modify the silica sol is alumina.

11. A method of manufacturing a rechargeable alkaline storage zinc battery, wherein the method comprises the steps of (i) obtaining a nanosized electrochemical dispersion consisting of a metalate modified silica sol and at least one zinc solubility suppressing additive, in an electrolyte, (ii) adding the nanosized electrochemical dispersion in an electrolyte into a conventional alkaline storage zinc battery to obtain a rechargeable alkaline storage zinc battery, wherein a layer of the zinc solubility suppressing additive is adsorbed onto the metalate modified silica sol.

12. The method as claimed in claim 11, wherein metalate ions used to modify the silica sol are selected from the group consisting of alumina, lead, tin, and zinc the zinc solubility suppressing additives are selected from the group consisting of calcium hydroxide, barium hydroxide, strontium hydroxide, titanium oxide, indium hydroxide, borax and fluorides; wherein the concentration of the dispersion is in the range between 1 to 50 wt % of the electrolyte concentration.

13. A process to prevent dissolution of zinc in a battery, wherein the process comprises the steps of:
 a) adding to the battery a nanosized aqueous electrochemical dispersion consisting of a metalate modified silica sol and at least one zinc solubility suppressing additive, in an electrolyte, wherein a layer of the zinc solubility suppressing additive is adsorbed onto the metalate modified silica sol, and
 b) wherein the layer prevents the dissolution of zinc from a zinc electrode in the battery.

14. The process to prevent dissolution of zinc in a battery as claimed in claim 13, wherein metalate ions used to modify the silica sol are selected from group consisting of alumina, lead, tin, and zinc.

15. The process to prevent the dissolution of zinc in a battery as claimed in claim 14, wherein the metalate ion used to modify the silica sol is alumina.

16. The process to prevent dissolution of zinc in a battery as claimed in claim 13, wherein the zinc solubility suppressing additive is selected from the group consisting of calcium hydroxide, barium hydroxide, strontium hydroxide, titanium oxide, indium hydroxide, borax and fluorides.

17. The process to prevent dissolution of zinc in a battery as claimed in claim 13, wherein the concentration of the dispersion is in the range between 1 to 50 wt % of the electrolyte concentration.

* * * * *